Figure 2:
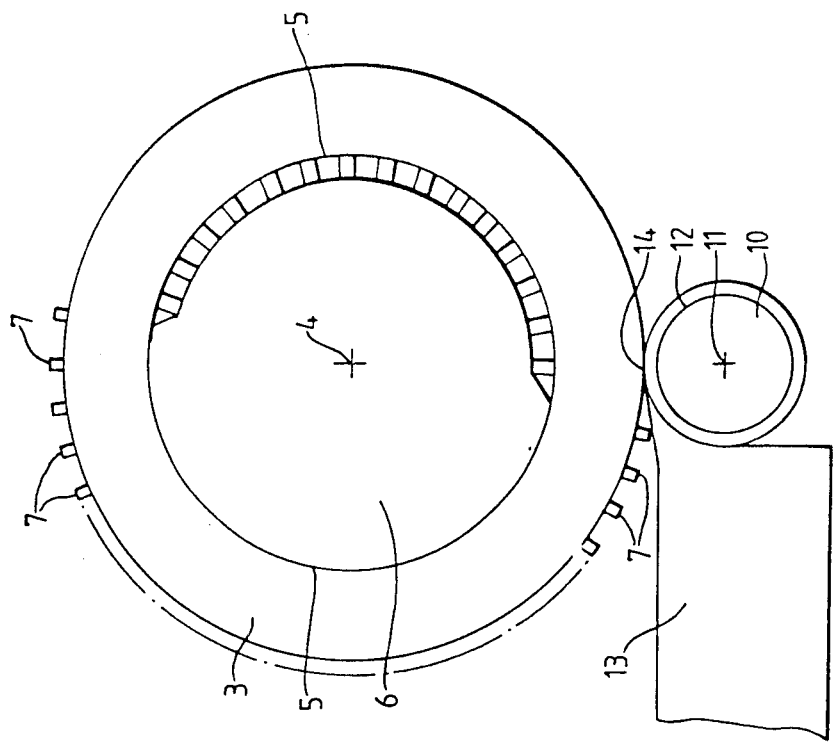

United States Patent [19]

Mela

[11] Patent Number: 4,613,390
[45] Date of Patent: Sep. 23, 1986

[54] METHOD AND APPARATUS FOR MANUFACTURING A HEATER

[76] Inventor: Martti Mela, Oulun Yliopisto, Biofysiikan laitos, Linnamaa, 90570 Oulu, Finland

[21] Appl. No.: 694,403
[22] PCT Filed: May 11, 1984
[86] PCT No.: PCT/FI84/00034
§ 371 Date: Jan. 4, 1985
§ 102(e) Date: Jan. 4, 1985
[87] PCT Pub. No.: WO84/04647
PCT Pub. Date: Nov. 22, 1984

[30] Foreign Application Priority Data

May 11, 1983 [FI] Finland ................................ 831653

[51] Int. Cl.⁴ .............................................. H06B 3/00
[52] U.S. Cl. ..................................... 156/177; 29/611; 156/273.9; 156/303.1; 156/379.7; 156/440
[58] Field of Search ............... 156/176, 177, 273.9, 156/379.7, 433, 439, 440, 309.6, 303.1, 298, 309.9; 219/544, 546, 549; 338/212, 293; 29/611

[56] References Cited

U.S. PATENT DOCUMENTS

| | | | |
|---|---|---|---|
| 2,548,467 | 4/1951 | Crise | 219/46 |
| 2,613,306 | 10/1952 | Woltersdorf et al. | 338/293 |
| 3,594,256 | 7/1971 | Schuller et al. | 156/440 |
| 3,659,338 | 5/1972 | McFarlane | 219/549 |
| 3,954,547 | 5/1976 | Genthner | 156/177 |
| 3,964,959 | 6/1976 | Adams | 156/177 |

FOREIGN PATENT DOCUMENTS

| | | | |
|---|---|---|---|
| 3013778 | 10/1981 | Fed. Rep. of Germany . | |
| 3132188 | 3/1983 | Fed. Rep. of Germany . | |
| 2495426 | 6/1982 | France . | |
| 49-14017 | 4/1974 | Japan . | |
| 52-47176 | 11/1977 | Japan . | |
| 52-154128 | 12/1977 | Japan . | |
| 78065430 | 12/1979 | Sweden . | |
| 483771 | 2/1970 | Switzerland . | |
| 1256972 | 12/1971 | United Kingdom | 29/618 |
| 430566 | 1/1975 | U.S.S.R. | 338/312 |

Primary Examiner—Michael Ball
Attorney, Agent, or Firm—Burns, Doane, Swecker and Mathis

[57] ABSTRACT

Method for the preparation of a band, sheet, foil, fabric, mesh, or a similar plastic layer that is heatable by means of an electric resistance wire. Thereat, having been heated by means of electric current, the resistance wire is pressed into the said plastic layer consisting of a thermoplastic when this layer is partly softened or molten by the effect of the hot wire at the wire.

7 Claims, 5 Drawing Figures

METHOD AND APPARATUS FOR MANUFACTURING A HEATER

The invention is concerned with a method for the preparation of a band, sheet, foil, fabric, mesh or a similar plastic layer that is heatable by means of an electric resistance wire.

The invention is also concerned with an apparatus for the application of the method.

A sheet or hand heatable by means of an electric resistance wire and prepared by means of the method meant in the present invention can be used as such or as cut-off to primary elements of appropriate size for most varied purposes. They may be used as coated with a layer or layers of cloth in or on, e.g., seats, in particular car seats, covers, clothes, e.g. diver's suits, gloves, shoes, etc. for heating them and for other, corresponding purposes. The elements are heated by means of the resistance wires contained therein by means of electric current, preferably a low-voltage current.

The method of preparation meant in the invention is in particular characterized in that, having been heated by means of electric current, the resistance wire is pressed into the said plastic layer consisting of a thermoplastic when this layer is partly softened or molten by the effect of the hot wire at the wire and that the wire then remains inside the plastic when the plastic is again cooled and receives its former state, whereinafter, when the resistance wire is heated to an appropriate extent by means of electric current, while the plastic does not become excessively soft and while the resistance wire remains in it, the plastic layer can be used for heating the desired objects.

The apparatus in accordance with the invention is characterized in that the apparatus comprises a drum and a roll pressing against the drum, the plastic layer being fed to between the drum and the roll, whereat the resistance wire heated by means of electric current is pressed into the plastic.

Figure 1:
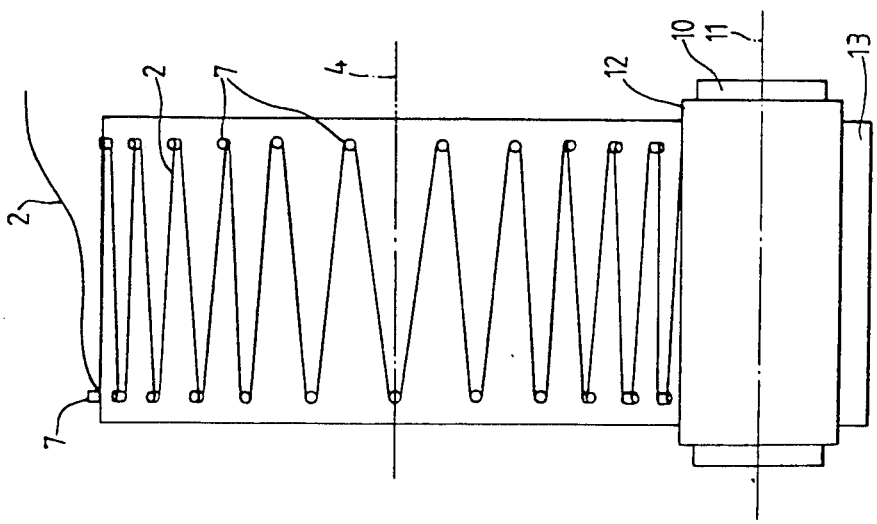
Figure 3:
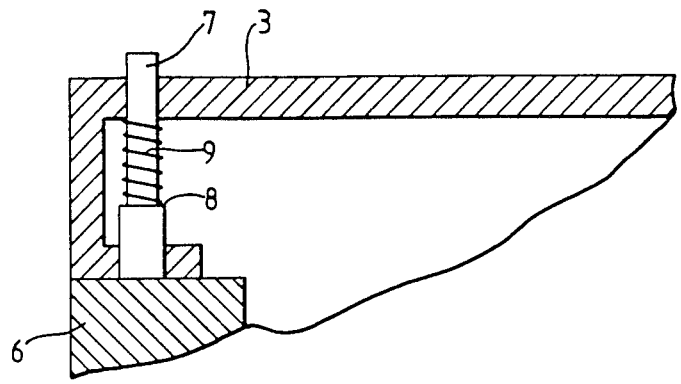
Figure 4:
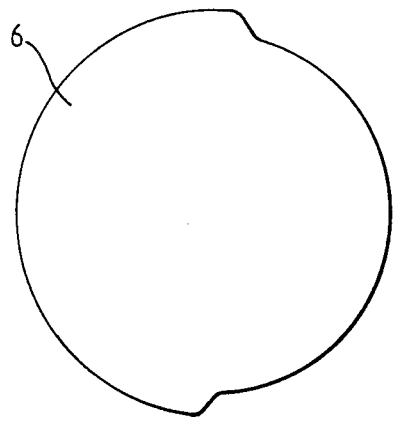

An embodiment of the invention will be described in the following with reference to the attached drawings. They are schematical illustrations:

FIG. 1, of an apparatus for carrying out the method as viewed from behind,

FIG. 2, of the same as FIG. 1, but as a side view,

FIG. 3, of the apparatus on an enlarged scale as a partial sectional view,

FIG. 4, of a part taken apart from the apparatus, and

Figure 5:
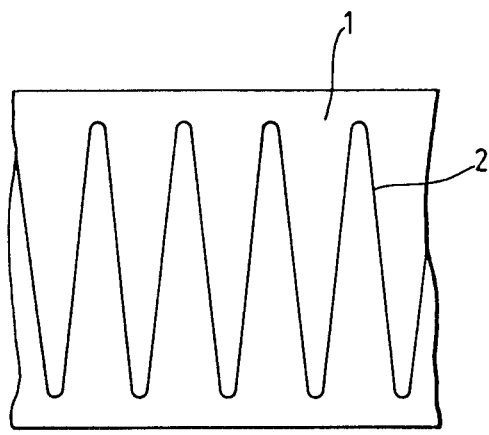

FIG. 5, of an element band manufactured in accordance with the method.

The product shown in FIG. 5 is a band of uniform width, of a thickness, e.g., of 1 mm or less and of a width, e.g., of 5 to 10 cm. The material of the band is of a flexible thermoplastic plastic, as solid or perforated. It may also be of a mesh structure, whereat the area of the meshes or openings in the net is, e.g., about one half or more than one half of the overall area of the net. The meshes in the net may be small, e.g. about 1 to 2 sq. mm.

Into the band, a thin resistance wire 2 has been pressed as hot, the said wire winding back and forth in the band 1 in the way shown in FIG. 5. The resistance wire may be thin, e.g. $\phi$ about 0.1 mm or less. Out of the continuous element band meant in FIG. 1, it is possible to make primary elements by cutting it into pieces of appropriate length, for being placed into the object of heating. Several primary elements may be connected electrically in parallel, and the supply of current into the resistance wires can be arranged, e.g., from a transformer, from a rectifier, from an accumulator, or from a battery via supply conductors common for the primary elements. Owing to the low voltage (e.g., 12 to 24 V), the connections do not require particular protections, and the heat that is generated does not melt the plastic.

The resistance wires for the primary element may also be manufactured of an appropriate iron alloy, besides the usual metal alloys used for this purpose in prior art, in which case their cost is more favourable than the cost of wires made of a manganese alloy or equivalent. When an alloy of iron is used, a favourable dependence on the temperature is obtained for the resistance wire: An increase in temperature increases the resistance value of the primary element and, with constant-voltage supply, the output is reduced. In this way, a local self-control property is obtained for the network, which causes a more isothermic distribution of temperature in the element itself.

The apparatus for the preparation of the element band comprises a drum 3, which can be rotated on its shaft 4 attached to the frame of the machine (not shown in the drawing), e.g., by means of a motor (not shown). The end walls of the drum extend as a flange towards the centre to the circumference 5 of a circle inside which there are, at each end of the drum, centre pieces 6 stationarily mounted to the frame, the shape of the said centre pieces being shown in FIG. 4 as viewed in the direction of viewing of FIG. 2.

In the mantle face of the drum, near its edges, there are uniformly spaced radial holes and pins 7 in the holes. FIG. 3 is an enlarged and partial view of an axial vertical section through FIG. 2, at the topmost pin 7 shown therein. The pin 7 is of circular section, and its bottom portion extends at the shoulder 8 downwards as thicker. Between the shoulder and the inside face of the drum, there is a spiral spring 9 around the pin, which spring presses the pin downwards, against a stationary guide piece 6, and the pin is capable of moving in its longitudinal direction in the corresponding holes in the drum.

When the drum revolves, the guide pieces 6 push the outermost ends of the pins 7 somewhat out of the mantle face of the drum, as is shown in FIG. 2, on the left-side portion of the drum. Correspondingly, on the right-side portion of the drum, by the effect of the springs 9, the outermost ends of the pins have been pulled to the level of, or slightly inside, the outer face of the drum as the lower ends of the pins are placed against the guide piece 6.

Underneath the drum 3, there is a cylindrical roll 10, which can revolve around its shaft 11 attached to the frame. The roll 10 is coated with a resilient layer 12, e.g., of rubber, which is compressed against the drum. In front of the roll, there is a feeding table 13. The upper part of the end of the table placed next to the roll is shaped as downwardly concave so that it runs along the mantle face of the roll and extends to the proximity of the contact point 14 between the roll and the drum.

When element band is being prepared by means of the appartus, the drum 3 is rotated, according to FIG. 2, anti-clockwise. The resistance wire 2 is threaded, e.g., by means of a separate threading device (not shown in the figure) around the pins 7 in the upper portion of the drum so that, on the face of the drum, the wire receives a form somewhat resembling the toothing of a saw, shown in FIG. 1. Accordingly, the wire 2 is wound about consecutive pins 7 so as to from wire segments extending from one pin to the next. The wire is on the drum in this form even when the roll 10 presses the thermoplastic plastic band fed from the table 13 to between the drum 3 and the roll 10, 12.

By means of electric conductors and connecting devices (not shown in the drawings), an appropriate electric voltage is connected between two pins 7 placed on the drum. One of these pins is close to the face of the feeding table, or even in contact with it, and the other one of the pins is at an appropriate distance higher on the drum. Inside the drum, there are collector means of a construction in itself known, e.g. similar to those in a DC motor, which, when the drum revolves and when the pins are in, and close to, the said locations, connect the voltage to the said pins. The current provided by the electric voltage in the resistance wire between the pins heats the resistance wire appropriately so that, being pressed by the roll 10, it is well pressed into the thermoplastic plastic film or net when it is fed in between the roll and the drum 3. The heated wire softens and melts the plastic layer only locally, so that this portion is, soon after the wire has been submerged into it, again stiffened after the band leaves the space between the drum and the roll, while the resistance wire remains inside the thermoplastic. In this way, this apparatus permits continuous production of long element bands. Owing to the elasticity of the material, they can be wound onto rolls, from which suitable pieces are then cut off when required. If it is so desired, an element band manufactured in the above way may still be coated with an additional layer or layers of plastic.

If required, the apparatus described above may be connected with control devices (not shown in the drawings) by means of which it is possible to control, e.g., at what positions on the drum the pins are between which the electric voltage is connected in each particular case. As a rule, is is preferable that the resistance wire is heated rapidly only slightly before it is pressed into the plastic. In such a case, hardly any oxydizing has time to take place, and the extending of the wire by the effect of heat does not have time to become detrimental.

If necessary, the position of the guide piece 6 may also be adjusted by turning it around its axis and by then locking it in its position. This has an effect on the position at which the pins are retracted into the drum and at what position they come out of the drum. Of course, other adjustments are also purposeful, such as adjustments of the voltage and of the intensity of the current, etc. The current may be adjusted in relation to the speed of rotation and to the position of the drum. The value of the current depends on the properties of the plastic band material and on the speed of rotation of the drum.

I claim:

1. A method of manufacturing an article comprising a plastic layer and an electric resistance wire in said plastic layer, said method comprising the steps of:
   continuously winding said wire into sequential segments;
   holding said wire in said sequential segments;
   heating individual wire segments in sequence by conducting electric current through each wire segment individually; and
   embedding each individually heated wire segment into said plastic layer by pressing said heated wire segment and a portion of said plastic layer between opposing pressing surfaces.

2. The method as claimed in claim 1, wherein the segment of the said wire that is being heated and pressed into the plastic layer is shifted periodically or continuously relative the plastic layer and the wire, or the other way round, the plastic layer and the wire, are correspondingly shifted relative devices that heat the wire and perform its said pressing.

3. The method as claimed in claim 1, wherein said winding and holding steps include winding and holding said wire in sequential segments about successive spaced apart pins and said step of individually heating includes passing electric current through successive pairs of said pins.

4. An apparatus for manufacturing an article comprising a plastic layer and an electric resistance wire in said plastic layer, said apparatus comprising:
   a rotatable drum having a plurality of spaced apart pin means projecting from said drum for holding the wire in a wound condition on said drum, said wound condition resulting from said wire being continuously wound into sequential segments from one pin means to another pin means as said drum rotates;
   a roll pressing against the drum;
   means for feeding the plastic layer between the drum and the roll;
   means for rotating said drum, whereby said wound wire is moved along a feed path to said roll; and
   means at a location along said feed path for passing electric current through individual wire segments in sequence as said drum rotates, whereby said wire segments become individually heated.

5. Apparatus as claimed in claim 4, wherein said drum includes automatic means for temporarily retracting members of said plurality of pin means into the drum as they are moved past said roll, whereby the detaching of the finished product from the drum becomes easier.

6. The apparatus of claim 4, wherein said electric current passing means passes electric current through successive pairs of said plurality of pin means.

7. The apparatus of claim 6, wherein said plurality of pin means are arranged along two rows extending circumferentially around said drum, said wire being continuously wound into sequential segments from pin means of one row to pin means of the other row.

* * * * *